Figure 1:
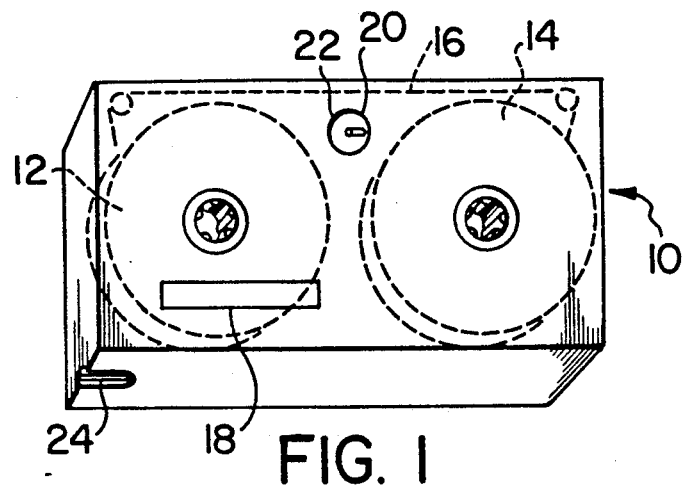

United States Patent [19]

Anderson

[11] Patent Number: 5,040,210
[45] Date of Patent: Aug. 13, 1991

[54] LOCKABLE TAPE CASSETTE CONTROL SYSTEM

[75] Inventor: Joseph Anderson, Mississauga, Canada

[73] Assignees: Arena Recreations (Toronto); William Lawrence Heisey, both of Toronto, Canada

[21] Appl. No.: 560,048

[22] Filed: Jul. 30, 1990

[51] Int. Cl.⁵ .................... G11B 23/28; H04K 1/00
[52] U.S. Cl. ............................... 380/3; 380/5; 380/22; 380/23; 380/52; 360/132
[58] Field of Search ................. 350/APS 3-5, 350/22, 52, 23; 242/198, 200; 360/27, 132; 358/APS 349

[56] References Cited

U.S. PATENT DOCUMENTS

| | | | |
|---|---|---|---|
| 4,528,588 | 7/1985 | Löfberg | 380/5 |
| 4,632,335 | 12/1986 | Dickson et al. | 242/200 |
| 4,802,212 | 1/1989 | Freeman et al. | 380/3 |
| 4,874,143 | 10/1989 | Armstrong et al. | 242/198 |
| 4,930,158 | 5/1990 | Vogel | 380/5 |
| 4,947,318 | 8/1990 | Mineo | 380/4 X |

FOREIGN PATENT DOCUMENTS 3728168  3/1989  Fed. Rep. of Germany .......... 380/5

Primary Examiner—Linda J. Wallace
Attorney, Agent, or Firm—Fetherstonhaugh & Co.

[57] ABSTRACT

A tape cassette which locks up to prevent more than one play through of the information carrying portion of the cassette has a label with an encrypted unlocking combination for the cassette along with a memory address for a key code needed to decrypt the combination. A locked up cassette may be inserted in an unlock terminal which reads the information on the label and looks in memory at the address on the label for a key code. The returned key code is used to decrypt the unlocking combination read from the label and the unlocking combination is applied to unlock the cassette. A host may intermittently communicate with the unlock terminal in order to update the memory of the unlock terminal.

10 Claims, 2 Drawing Sheets

LOCKABLE TAPE CASSETTE CONTROL SYSTEM

This patent relates to a lockable tape cassette and a device for unlocking the cassette.

U.S. Pat. No. 4,632,335 to Dickson and Armstrong dated Dec. 30, 1986 discloses a cassette with a take-up reel having a roller cage element disposed adjacent a fixed plate having a complimentary roller cage element. Rollers are received in the cages formed by the two elements. The roller cages are narrower toward their reverse feed end so that the cage elements lock together when an attempt is made to rewind the tape, hence, rewinding is inhibited. To allow rewinding, the rollers may be displaced to inoperative positions in their roller cages by inserting pins of appropriate length into the roller cages. The inoperative positions vary from roller to roller so that the appropriate combination of pin insertion lengths must known for a particular cassette in order to effect rewinding. Accordingly, to unlock a cassette, the cassette may be input to an unlock terminal which reads a serial number on a label on the cassette. The unlock terminal then interrogates a host computer with this serial number and provides information from which the host can validate the request. The host responds with an unlock code; that is, information on how far to insert pins into the roller cages of the cassette. The unlock terminal then inserts pins in the roller cages to an appropriate length and rewinds the tape so that it is ready for replay.

The system of this patent suffers the drawback that the unlock terminal must interrogate the host each time it is desired to unlock a cassette. This requires a host communication system which can cope with communication traffic in times of high demand from the unlock terminals serviced by the host. It also leads to the prospect of delays consequent upon the queuing of a plurality of requests.

This invention seeks to overcome drawbacks of previous lockable tape cassette control systems. Accordingly, there is provided a tape cassette comprising: a tape feed lock means for inhibiting the feeding of the tape of said tape cassette in predefined circumstances; a combination lock means for controlling said tape feed lock means to uninhibit the feeding of the tape of said cassette when an unlocking combination is entered thereto; a label means bearing an indication of an address for a key code and an indication of the unlocking combination for said combination lock means encrypted by said key code.

In another aspect there is provided, an unlock terminal for use with a tape cassette of the type having a tape feed lock means for inhibiting the feeding of the tape of said tape cassette in predefined circumstances; a combination lock means for controlling said tape feed lock means to uninhibit the feeding of the tape of said cassette when an unlocking combination is entered thereto; a label means bearing an indication of an address for a key code and an indication of the unlocking combination for said combination lock means encrypted by said key code, said unlock terminal comprising: a key code memory for storing a plurality of key codes at key code addresses for said key codes; tape cassette reception means for receiving a tape cassette; label reading means for reading information from the label means of a tape cassette received by said tape cassette reception means; key code retrieving means responsive to said label reading means for retrieving the contents of said key code memory at the address of said key code memory indicated by a key code address read by said label reading means; decryption means responsive to said key code retrieving means and said label reading means for decrypting an encrypted unlocking combination read by said label reading means with a key code retrieved by said key code retrieving means; and combination lock operating means responsive to said decryption means for operating a combination lock means of a cassette received by said tape cassette reception means in accordance with the unlocking combination decrypted by said decryption means.

Figure 2:
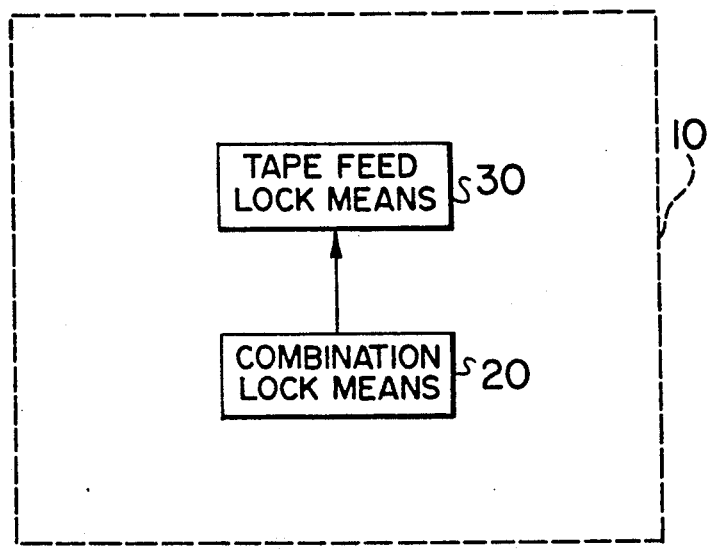
Figure 3:
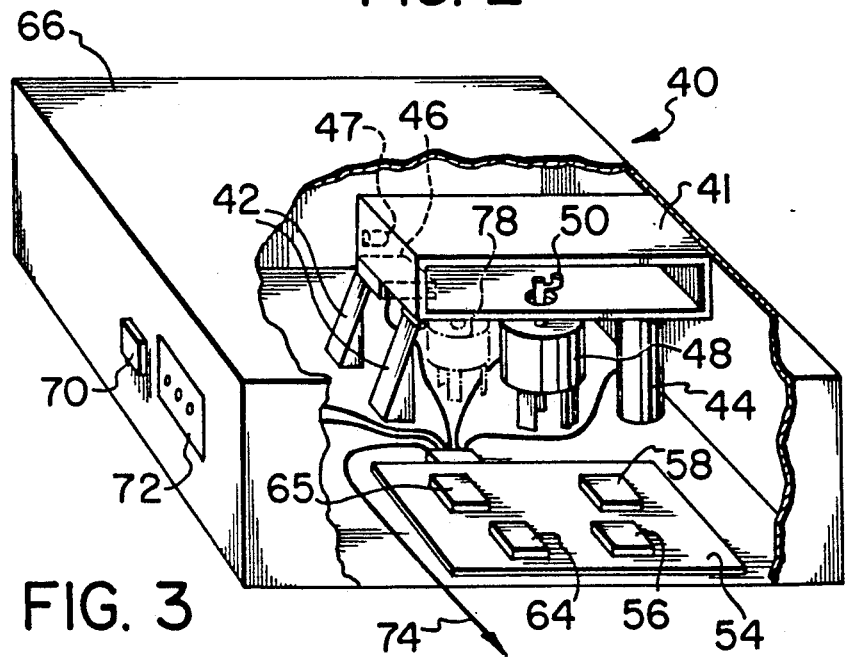
Figure 4:
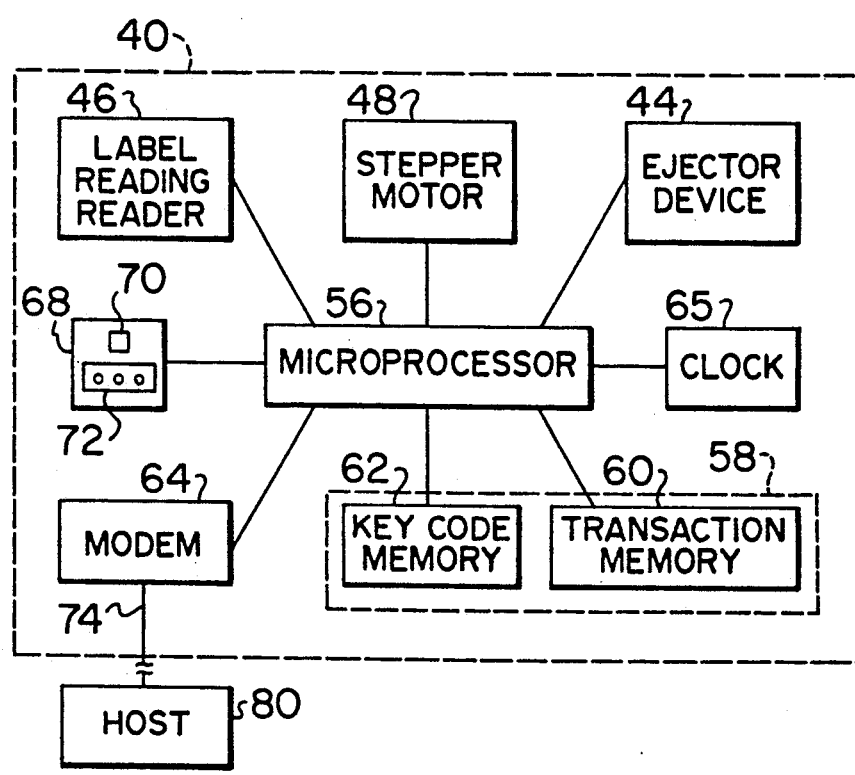

In the figures which represent example embodiments of the invention,

FIG. 1 is a bottom perspective view of a tape cassette constructed in accordance with this invention, FIG. 2 is a functional block diagram of a tape cassette constructed in accordance with this invention, FIG. 3 is a partially cut away perspective view of an unlock terminal constructed in accordance with this invention, and FIG. 4 is a schematic diagram of the unlock terminal of FIG. 3.

Turning to FIG. 1, a tape cassette 10 comprises a supply reel 12 and a take-up reel 14 for tape 16. The cassette carries a label 18 which may be a bar coded strip or a magnetic strip. The cassette also has a combination lock means 20. The combination lock means 20 is operable by means of slotted disk 22 in the base of the cassette. The cassette also includes a registration slot 24.

With reference to FIG. 2, the cassette includes a tape feed lock means 30 for inhibiting the feeding of the tape of the tape cassette in predefined circumstances. For example, the tape feed lock means may inhibit rewinding of the tape such as is the case with the tape feed lock means described in the aforementioned U.S. Pat. No. 4,632,335. The combination lock means 20 is operatively connected to the tape feed lock means such that entry of a certain combination to the combination lock means, which is referred to herein as an unlocking combination, controls the tape feed lock means so as to uninhibit the feeding of the tape of the cassette. For example, in U.S Pat. No. 4,874,143 to Armstrong and Granzotto dated Oct. 17, 1989, a tape feed lock means inhibits rewinding of the tape unless an unlocking combination is entered to a combination lock means by means of a rotatable slotted disk located at the base of the cassette. Entry of the unlocking combination acts to disable the tape feed lock means. In this patent, the tape feed lock means remains disabled until the combination lock is scrambled, consequently, the tape may be rewound while the tape feed lock means is disabled. The disclosure of this patent is hereby incorporated by reference. By way of a further example, the tape feed lock means may inhibit forward feeding after the tape has been played through once until the tape feed lock means is reset by entry of an unlocking combination to the combination lock means. The particular combination lock means and tape feed lock means employed in the tape cassette are not important to this invention and are therefore not further detailed.

Label 18 carries an indication of (1) the unlocking combination for the combination lock means of the cassette encrypted by a key code, (2) a memory address for the encrypting key code, (3) the serial number of the cassette, and (4) the information carried on the tape of the cassette.

FIGS. 3 and 4 illustrate an unlock terminal for the cassette of FIGS. 1 and 2. The unlock terminal, indicated generally at 40, has a tape cassette receptor 41 The cassette receptor is supported at its rearward end by hinged supports 42 and at its front end by ejection device 44. The front end of the cassette receptor is open. A label reading means 46 such as a bar code reader or a magnetic strip reader, is positioned adjacent the bottom of the cassette holder so as to underlie the label 18 of any cassette inserted in the cassette holder The cassette receptor has a registration key 47. The unlock terminal also comprises a stepper motor 48 with a shaft terminating in a boss 50 for engaging the slotted disk 22 of combination lock means 20 of a cassette of the type illustrated in FIG. 1 in order to operate same. The terminal includes a PCB 54 carrying a microprocessor 56, a memory 58 comprising a transaction memory 60 and a key memory 62, a modem 64, and a clock 65. The housing 66 of the unlock terminal supports a control panel 68 comprising a start button 70 and an indicator panel 72 both operatively connected to the microprocessor. The label reading means 46, stepper motor 48, ejector device 44, control panel 68, modem 64, clock 65, and memory 58 are all operatively connected to the microprocessor 56. The modem 64 is connected to a host computer 80 by a communication link 74. The unlock terminal may also include a rewind motor, indicated in phantom at 78.

Prior to the operation of the unlock terminal of FIGS. 3 and 4, cassette receptor 41 is normally in an eject position whereat the receptor is tilted about supports 42 so as to expose the open front end of the receptor. In this eject position, a cassette of the type illustrated in FIG. 1 may be inserted through the open front end of the receptor until the inserted end of the cassette abuts the rear of the cassette receptor whereupon the cassette receptor may be pushed closed (FIG. 3 illustrates the cassette receptor in its closed position). It is noted that the registration slot 24 of the cassette must be registered with the registration key 47 of the unlock terminal in order for the cassette to be fully inserted into the cassette receptor such that the cassette receptor can be closed.

Once the cassette receptor is closed, the start button 72 may be depressed which signals the microprocessor 56 to activate label reading means 46 to read the information on the label 18 of the cassette and pass this information to the microprocessor. The microprocessor is preprogrammed to divide the received information on the label into four segments representing the aforementioned four items of information carried by the label. The segment representing a memory address of a key code is used by the microprocessor to address the key code memory 62. The key code returned by the memory is then applied by the processor to decrypt the segment read from the label which represents an encrypted combination. The decrypted combination is then used by the microprocessor in the control of the stepper motor 48 to enter the unlocking combination to the combination lock means of the cassette through selective rotation of the slotted disk 22 of the combination lock means by boss 50 of the stepper motor.

If the tape cassette is of the type wherein the tape feed lock means inhibits rewinding of the tape, the unlock terminal will include a rewind motor 78 which is activated by the microprocessor after entry of the unlocking combination in order to rewind the tape of the cassette. The microprocessor may then scramble the combination lock means once more to re-enable the tape feed lock means. If the tape cassette is of the type where the tape feed lock means is reset by entry of the unlock combination, the microprocessor may simply scramble the combination after entry of the unlock combination.

The segments of the data read from the label means which represent the serial number of the cassette and the information stored on the tape of the cassette is stored by the microprocessor in the transaction memory 60 along with an indication of the current date and time read from clock 65. The microprocessor then illuminates a light on the indicator panel 72 to indicate successful completion of the unlock operation and activates ejector 44 to return the tape receptor 41 to its eject position in order that the tape may be removed from the unlock terminal.

Certain address locations in the key code memory may not contain a key code but instead an indication that the key code for such address is unavailable; these indications are referred to herein as "unavailable indications". If a key code address read from a cassette label results in the return of an unavailable indication from the key code memory, the microprocessor sends an indication to the indicator panel that an unlock operation is not authorised and ejects the cassette without any attempt at decryption, without operating the stepper motor and without storing any information in the transaction memory.

At selected off peak times (for example overnight), the host 80 may establish communication with the microprocessor through modem 65 and communication link 74. During such communication the microprocessor uploads the contents of the transaction memory to the host. The host may download key code memory addresses and associated key codes or unavailable indications.

The host may service a great number of unlock terminals at distributed locations.

This invention has particular utility in the movie video cassette rental industry. In the application to such industry, each video cassette rental outlet would have an unlock terminal. The rental outlets share rental revenue with the copyright owners. With the system of this invention, revenue sharing is facilitated by the uploading of the contents of the transaction memory of the unlock terminals to the host since the transaction memory indicates which movies were rented from a given rental outlet in a given period. This system also allows rental outlets to be selectively allowed to rent certain movies by reason of the fact the host controls which key codes are transmitted to the key code memory of the unlock terminal. This type of control also allows the host to preclude any particular unlock terminal from unlocking any cassettes. Further, in this industry, a given movie is generally to be released simultaneously across the country. Currently, if the cassettes are distributed in advance of the release date, some rental locations may begin to rent the movies in advance of the intended release date. And any attempt to distribute the cassettes to all locations on the same day meets with considerable logistical difficulties. With the system of the present invention, these problems may be avoided by shipping the cassettes in advance of the release date in a locked state and only distributing the appropriate key code to the unlock terminals on the release date by downloading same from the host to the unlock terminals.

In order to enhance security, the serial number for the cassette may also be in an encrypted form on the label; in such case the key code would also be used to decrypt this information. Other modifications within the spirit of this invention will be apparent to those skilled in the art.

What is claimed is:

1. A tape cassette comprising:
   a tape feed lock means for inhibiting the feeding of the tape of said tape cassette in predefined circumstances;
   a combination lock means for controlling said tape feed lock means, to uninhibit the feeding of the tape of said cassette when an unlocking combination is entered thereto;
   a label means bearing an indication of an address for a key code and an indication of the unlocking combination for said combination lock means encrypted by said key code.

2. The tape cassette of claim 1 wherein said label means also bears an indication of an identification number for said cassette.

3. The tape cassette of claim 2 wherein said label means also bears an indication of the information carried by the tape of said cassette.

4. The tape cassette of claim 3 wherein said label means is a magnetic strip.

5. An unlock terminal for use with a tape cassette of the type having a tape feed lock means for inhibiting the feeding of the tape of said tape cassette in predefined circumstances; a combination lock means for controlling said tape feed lock means to uninhibit the feeding of the tape of said cassette when an unlocking combination is entered thereto; a label means bearing an indication of an address for a key code and an indication of the unlocking combination for said combination lock means encrypted by said key code, said unlock terminal comprising:
   a key code memory for storing a plurality of key codes at key code addresses for said key codes;
   tape cassette reception means for receiving a tape cassette;
   label reading means for reading information from the label means of a tape cassette received by said tape cassette reception means;
   key code retrieving means responsive to said label reading means for retrieving the contents of said key code memory at the address of said key code memory indicated by a key code address read by said label reading means;
   decryption means responsive to said key code retrieving means and said label reading means for decrypting an encrypted unlocking combination read by said label reading means with a key code retrieved by said key code retrieving means; and
   combination lock operating means responsive to said decryption means for operating a combination lock means of a cassette received by said tape cassette reception means in accordance with the unlocking combination decrypted by said decryption means.

6. The unlock terminal of claim 5 further including transaction memory means responsive to said label reading means for storing the tape cassette identification number and indication of the information carried by the tape of a cassette read by said label reading means.

7. The unlock terminal of claim 6 further including communication means for communicating with a host for receiving from said host key code memory addresses and data to be stored in said key code memory at such key code memory addresses and for transmitting to said host the contents of said transaction memory means.

8. The unlock terminal of claim 7 further including clock means responsive to said label reading means for indicating the time of a reading operation of said label reading means and means for storing said time in said transaction memory means along with said tape cassette identification number and said indication of the information carried by the tape of a cassette read by said label reading means.

9. The unlock terminal of claim 5 wherein said combination lock operating means is also for scrambling the combination lock means of a cassette subsequent to operating said combination lock means in accordance with said unlocking combination.

10. The unlock terminal of claim 5 wherein said key code memory is also for storing indications that key codes are not available at certain key code addresses and wherein said decryption means is not responsive to said key code retrieving means when said key code retrieving means retrieves an unavailable indication.

* * * * *